United States Patent [19]
Fewkes et al.

[11] Patent Number: 6,069,099
[45] Date of Patent: May 30, 2000

[54] SEALING GLASS PASTE METHOD

[75] Inventors: Edward J. Fewkes, Horseheads; Margaret E. Greene, Corning; Robert Morena, Caton; Frances M. Smith, Elmira, all of N.Y.

[73] Assignee: Corning Incorporated, Corning, N.Y.

[21] Appl. No.: 09/171,015

[22] PCT Filed: Apr. 21, 1997

[86] PCT No.: PCT/US97/06926

§ 371 Date: Oct. 8, 1998

§ 102(e) Date: Oct. 8, 1998

[87] PCT Pub. No.: WO97/41078

PCT Pub. Date: Nov. 6, 1997

Related U.S. Application Data

[60] Provisional application No. 60/016,477, Apr. 29, 1996.

[51] Int. Cl.[7] .................. C03C 8/14; C03C 8/20
[52] U.S. Cl. .................. 501/15; 501/17; 501/18; 501/20
[58] Field of Search .................. 501/15, 17, 18, 501/20

[56] References Cited

U.S. PATENT DOCUMENTS

| | | | |
|---|---|---|---|
| 5,376,596 | 12/1994 | Tokuda et al. | 501/19 |
| 5,470,804 | 11/1995 | Morena | 501/15 |
| 5,510,301 | 4/1996 | Fink et al. | 501/20 |
| 5,514,629 | 5/1996 | Morena | 501/15 |
| 5,516,733 | 5/1996 | Morena | 501/15 |
| 5,612,261 | 3/1997 | Lim et al. | 501/32 |
| 5,643,840 | 7/1997 | Hikata et al. | 501/18 |

*Primary Examiner*—Anthony Green
*Attorney, Agent, or Firm*—Milton M. Peterson

[57] ABSTRACT

A method of controlling the rheology of a sealing glass paste which comprises incorporating a fine inorganic powder in the paste as a mill addition to impart a steep rheology curve to the paste so that the paste resists flow while at rest, but flows readily when shear stress is applied, the amount of inorganic powder incorporated being not over about 10% by weight.

10 Claims, 3 Drawing Sheets

SEALING GLASS PASTE METHOD

This application claims the benefit of U.S. Provisional Application No. 60/016,477, express mailed Apr. 29, 1996, entitled SEALING GLASS PASTE METHOD, by Edward J. Fewkes, Margaret E. Greene, Robert Morena and Frances M. Smith.

FIELD OF THE INVENTION

Method of controlling the rheology of a sealing glass paste used in producing a fusion seal.

BACKGROUND OF THE INVENTION

Glasses that melt at relatively low temperatures have long been used to join metal, glass and ceramic components by a fusion seal. Initially, such seals were vitreous in nature. Lead glasses, particularly lead zinc borates and borosilicates, were commonly used.

The sealing art was revolutionized by discovery that such glasses could be crystallized in a controlled manner by thermal treatment. This combined the virtues of a low melting glass with a strong seal in the crystalline state.

More recently, non-lead glasses, composed essentially of tin, zinc, and phosphorous oxides, have been proposed as a substitute for the traditional lead zinc borate glasses. U.S. Pat. No. 5,246,890 (Aitken et al.) discloses examples of such phosphate glasses.

In forming a seal with such sealing glasses, it has become customary to use the glass in a particle form known as glass frit. The glass frit is mixed with a vehicle and binder to form a suspension, or paste. This mixture is applied to a sealing surface, for example, by extrusion.

Numerous organic vehicles and binders have been proposed. A combination of nitrocellulose and amyl acetate is commonly used in commercial cathode ray tube production. Recently, environmental concerns about volatile organic compounds (VOCs) have given rise to a proposal for substitution of an aqueous solution of a cellulosic polymer.

In preparing a sealing glass paste, serious consideration must be given to the rheological characteristics of the paste, that is, its flow or viscosity characteristics. The paste needs to be relatively fluid for application purposes. However, both before and after application, when the paste is at rest, it should be relatively stiff or viscous.

Prior to application, there may be a substantial delay between preparation of the paste and its use. This may be due to transportation or storage. If the paste is not sufficiently viscous, settling or separation of components may occur.

Frequently, a paste is applied by being extruded as a ribbon of the form required for sealing. It is desirable that the paste set quickly after application so as to avoid any flow that would cause loss of the extruded shape.

In order to meet these contradictory requirements, it has been proposed to employ a paste having the characteristics of a reversible gel. Such a paste exhibits a high viscosity during storage and/or after application, but exhibits a much lower viscosity when placed under shear stress. This stress may be created in a mixer, or by pressure applied during extrusion.

U.S. Pat. No. 4,260,406 (Corbett et al.) describes introducing a gelling agent into a paste to impart the characteristics of a reversible gel. A number of organic and inorganic gelling agents are disclosed as being useful. However, certain surfaceactive organic titanates, known as titanate coupling agents, are indicated to be preferred.

This known technique of controlling rheology is effective. However, it would be desirable to provide even better control. It would also be desirable to obtain such control without resort to the known gelling agents. In particular, it would be desirable to employ only non-volatile, non-combustible, inorganic additives.

It is a basic purpose of the present invention to provide a method of rheology control in a sealing glass paste that achieves these ends. Another purpose is to provide a method of control that utilizes an additive having the desired characteristics. A further purpose is to provide a method that permits an extended delay between preparation of a paste and its use without settling, or other undesirable separation, occurring. A still further purpose is to provide a method of rheology control that permits relatively easy application of the paste to a sealing surface.

SUMMARY OF THE INVENTION

The invention resides in a method of controlling the rheology of a sealing glass paste which comprises incorporating a fine, inorganic powder that is compatible in the paste as a mill addition to impart a steep rheology curve to the paste so that the paste resists flow while it is at rest, but flows readily when shear stress is applied, the amount of fine, inorganic powder incorporated being not over about 10% by weight of the sealing paste.

The invention further resides in a method of preparing a sealing glass paste for use in producing a fusion seal, which comprises controlling the rheology of the paste by incorporating a fine, inorganic powder in the paste as a mill addition to impart a steep rheology curve to the paste so that the paste resists flow while at rest, but flows readily when shear stress is applied, the amount of inorganic powder incorporated being not over about 10% by weight.

PRIOR ART

Prior literature of possible interest is listed in an accompanying document.

BRIEF DESCRIPTION OF THE DRAWING

In an accompanying drawing.

DESCRIPTION OF THE INVENTION

Figure 1:
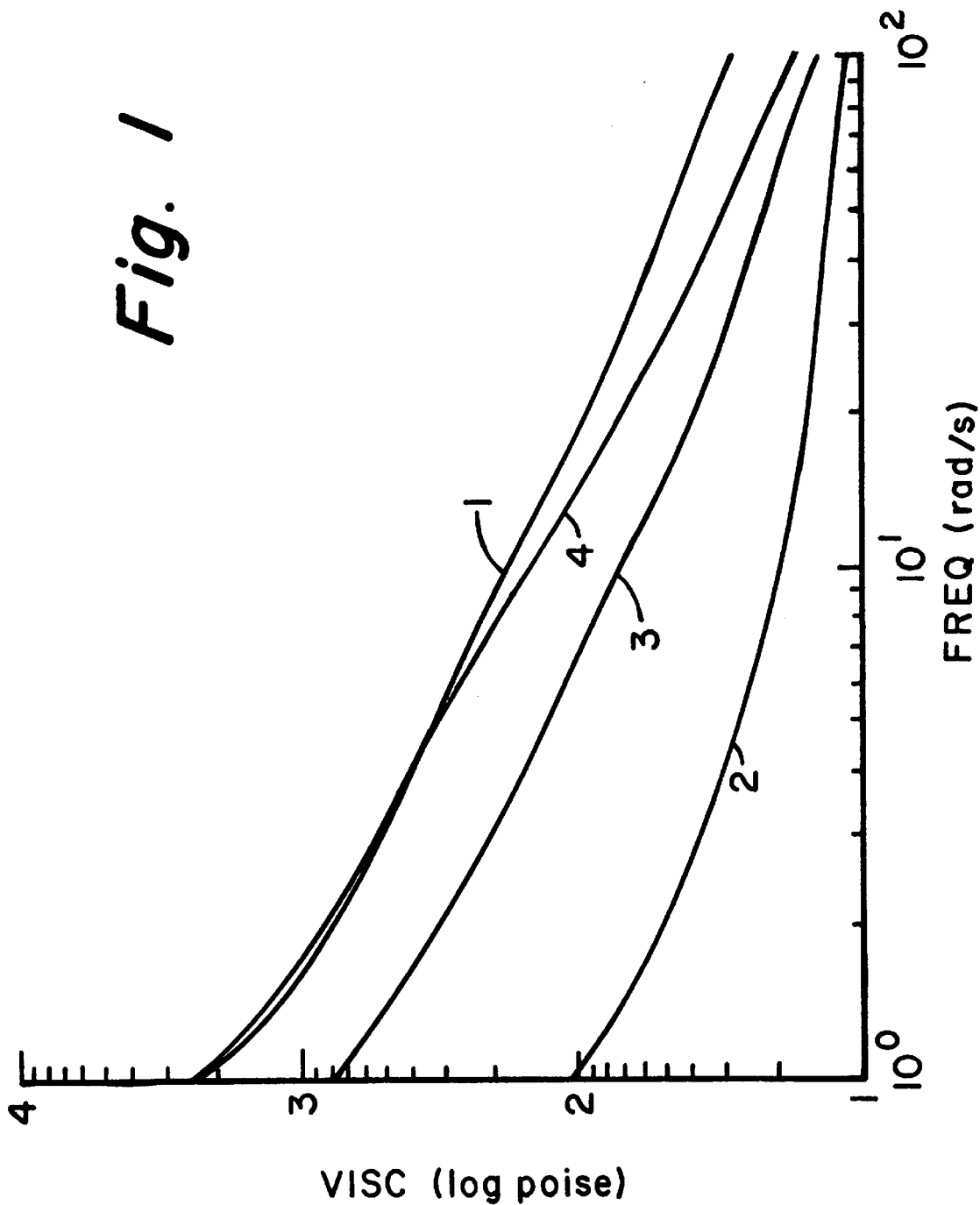
FIG. 1 is a graphical representation of the invention as applied to a non-lead sealing glass.

The present invention arose from efforts to provide a simple, but effective, method of controlling the rheology of a sealing glass paste. Such pastes are widely used in producing fusion seals to join component parts. These components may, for example, be parts of cathode ray tubes, electric lamp envelopes, and display screens. Present commercial practice in preparing a sealing glass paste employs a sealing glass frit dispersed in a vehicle of nitrocellulose dissolved in amyl acetate.

A sealing glass paste is prepared by dispersing the glass, in the form of frit, in the vehicle. The frit may be dispersed by agitating in equipment, such as a Hobart double planetary mixer, or any of various known mixers, to produce a homogeneous mass. The ratio of glass frit to vehicle may vary widely, but the amount of glass generally exceeds the amount of vehicle. Typically, the glass frit, on a weight basis, may be 80–90% of the mixture in the absence of mill additions.

As noted earlier, it is desirable to produce a sealing glass paste having the rheological characteristics of a reversible gel. This requires the paste to be relatively stiff as prepared in order to avoid settling of the heavier frit on standing. However, a stiff paste cannot be easily dispensed onto a sealing surface. Therefore, the paste should change to a relatively fluid state for application purposes. In accordance with the present invention, this results from shear stress, such as occurs in mixing, or during extrusion.

The Corbett et al. patent describes use of gelling agents, particularly organic titanates to achieve that end. Other modifiers have also been proposed for the purpose.

The present invention achieves the rheological characteristics of a reversible gel by adding a fine inorganic powder, with a high surface reactivity, to the paste mixture as a mill addition. The fine powder addition imparts a superior rheology to the paste whereby the dispensability of the paste is greatly facilitated. It accomplishes this without the addition of either rheology modifiers or surfactants.

The effect on rheology has been studied using fine alumina powder because of the ready availability of that material commercially. However, as shown subsequently, the effect does not appear to be limited to that material. Rather, it appears to be due to the fine particle size of a material, not the materials chemical constitution.

We believe that the improved rheology, observed with a fine inorganic powder, is due to increased interaction with the polymer nitrocellulose. When the polymer is coiled at low shear, the particles clump together and the paste appears viscous. During high shear, the polymer extends, the particles separate, and the paste appears to be thinner. In any event, the effect is observed in the absence of added surfactants or rheology modifiers.

Our studies with alumina have shown that the unique rheological effect is achieved with a commercially available alumina having an average particle size of 0.5 microns. Coarser aluminas, in the range of 6–15 microns average particle size, have proven relatively ineffective. In general, the alumina must have an average particle size below 3 microns, preferably less than 1 micron. Up to about 10% by weight of the fine powder may be added without unduly affecting paste consistency. However, we prefer to employ no more than about 1% in a blend.

The effect on rheology has been found to be independent of the sealing glass composition. Thus, it has been found to be effective in both the commercially used lead glasses and in non-lead glasses, such as the phosphate disclosed in the Aitken et al. patent.

Lead borate, or lead borosilicate, glasses consist essentially of 70–80% PbO, 10–14% ZnO, 6–12% $B_2O_3$, 0–3% $SiO_2$ and 0–3% BaO. In addition to being lead-free, the Aitken et al. glasses have compositions containing 25–50 mole % $P_2O_5$ and SnO and ZnO in amounts such that the mole ratio of SnO:ZnO is in the range of 1:1 to 5:1. They are of particular interest for use in producing seals in cathode ray tube envelopes because of their relatively low tin oxide contents. For other purposes, higher ratios up to 10:1 or higher may be useful.

The Aitken et al. glass compositions may further contain up to 20 mole % modifying oxides including up to 5 mole % $SiO_2$, up to 20 mole % $B_2O_3$, and up to 5 mole % $Al_2O_3$. They may also contain one or more crystallization promoters selected from 1 to 5 mole % zircon and/or zirconia and 1–15 mole % $R_2O$. Additionally, the composition may include a seal adherence promoter selected from up to 5 mole % $WO_3$, up to 5 mole % $MoO_3$, up to 0.10 mole % Ag metal and mixtures.

The invention has been largely developed in conjunction with the commonly used commercial nitrocellulose binder dissolved in amyl acetate. However, considerable interest has developed recently with respect to vehicles having no volatile organic compounds (VOCs) as solvents. We have found that the present rheological effect is obtained equally in conjunction with such vehicles, including polymeric binders and organic/aqueous systems.

TABLE I sets forth a series of non-lead sealing glass compositions, and sealing paste blends employing these non-lead glass frits. The glass frits are blended with aluminas of varying particle size. The glass compositions are given in mole %, while the blends are in weight percent. The amount of alumina in each blend was maintained relatively constant to better compare the effect of particle size. The glass in blends 2–4 has a pyrophosphate stoichiometry, whereas that in blend 1 is a near orthophosphate. This illustrates the general applicability of the invention to non-lead glasses.

TABLE I

| Blend | 1 | 2 | 3 | 4 |
|---|---|---|---|---|
| $P_2O_5$ | 28.5 | 31.5 | 31.5 | 31.5 |
| ZnO | 6.4 | 14.6 | 14.6 | 14.6 |
| SnO | 63.6 | 51.2 | 51.2 | 51.2 |
| $B_2O_3$ | 1 | 1.5 | 1.5 | 1.5 |
| $Al_2O_3$ | 0.5 | 0.7 | 0.7 | 0.7 |
| $WO_3$ | 0 | 0.5 | 0.5 | 0.5 |
| Base Frit | 70 | 74 | 74 | 74 |
| Beta-eucryptite | 10 | 0 | 0 | 0 |
| Alumina (0.5μ) | 5 | 0 | 3 | 6 |
| Alumina (6–8μ) | 0 | 6 | 3 | 0 |
| Zircon | 15 | 20 | 20 | 20 |

Sealing glass pastes were prepared from each of the four blends by the addition of glass frit to an organic vehicle solution. The solution was 1.2% nitrocellulose in amyl acetate, and the frit to vehicle ratio was 5.8:1 on a weight basis. The pastes were mixed with a high speed disperser set at 600 rpm. The pastes thus prepared were analyzed on a Rheometrics RDA-II parallel plate analyzer. This analyzer is a parallel plate mechanism in which one of the plates is oscillated. A material sample is placed between the plates, and viscosity is measured as the oscillation rate is increased.

Rheological curves obtained from measurements made on the four blends described in TABLE I are plotted on FIG. 1 of the drawing. FIG. 1 is a graphical representation of viscosity measurements made on the dynamic analyzer. Viscosity is plotted in log poise on the vertical axis; oscillatory frequency is plotted on the horizontal axis in radians/second (rad/s). The rheological curves are identified by numbers corresponding to the blend numbers in TABLE I.

The increase in steepness of the rheological curves with increasing addition of fine alumina is evident. This unique effect of fine alumina, as contrasted to coarser alumina additions, is also evident. Thus, curves 1 and 4 are markedly steeper than curve 2 wherein the blend contained only coarse alumina. Curve 3, wherein the total alumina content was the same, but was split between coarse and fine particle size, shows an intermediate effect. The closeness of curves 1 and 4 indicate the independence of the viscosity effect from composition of the glass frit.

A steep rheology curve for a paste indicates that the paste will flow easily when exposed to an increase in shear. The steeper the curve, the greater the flow in a material when shear is applied. Another desirable characteristic of a paste having a steep curve is that it is very thick (or viscous) when at rest. This is desirable because it prevents a paste from settling during storage, and from deforming after application to a sealing surface. Thus, curves 1 and 4 are relatively steep in the low shear region of about 1 rad/s.

TABLE II sets forth, in weight %, a similar series of sealing glass paste blends in which alumina additions are made. Again, the alumina particle size is varied. The frit employed in these blends is a lead-zinc-borosilicate having a composition on a weight basis of:

| | |
|---|---|
| PbO | 74.5 |
| ZnO | 12.9 |
| $B_2O_3$ | 8.4 |
| $SiO_2$ | 2.2 |
| BaO | 1.9 |
| $Al_2O_3$ | 0.03 |

Blend 5 in TABLE II has a mixture of coarse aluminas added. Blend 7 has the same amount of alumina added, but in a single coarse particle size. Blend 6 has a corresponding addition of alumina, but in a fine particle size. A sealing glass paste was prepared with each of the blends of TABLE II. The procedure described above was employed, except that the frit:vehicle ratio was approximately doubled to nearly 12:1. Rheology measurements were made with the oscillatory analyzer, also as described above.

Figure 2:
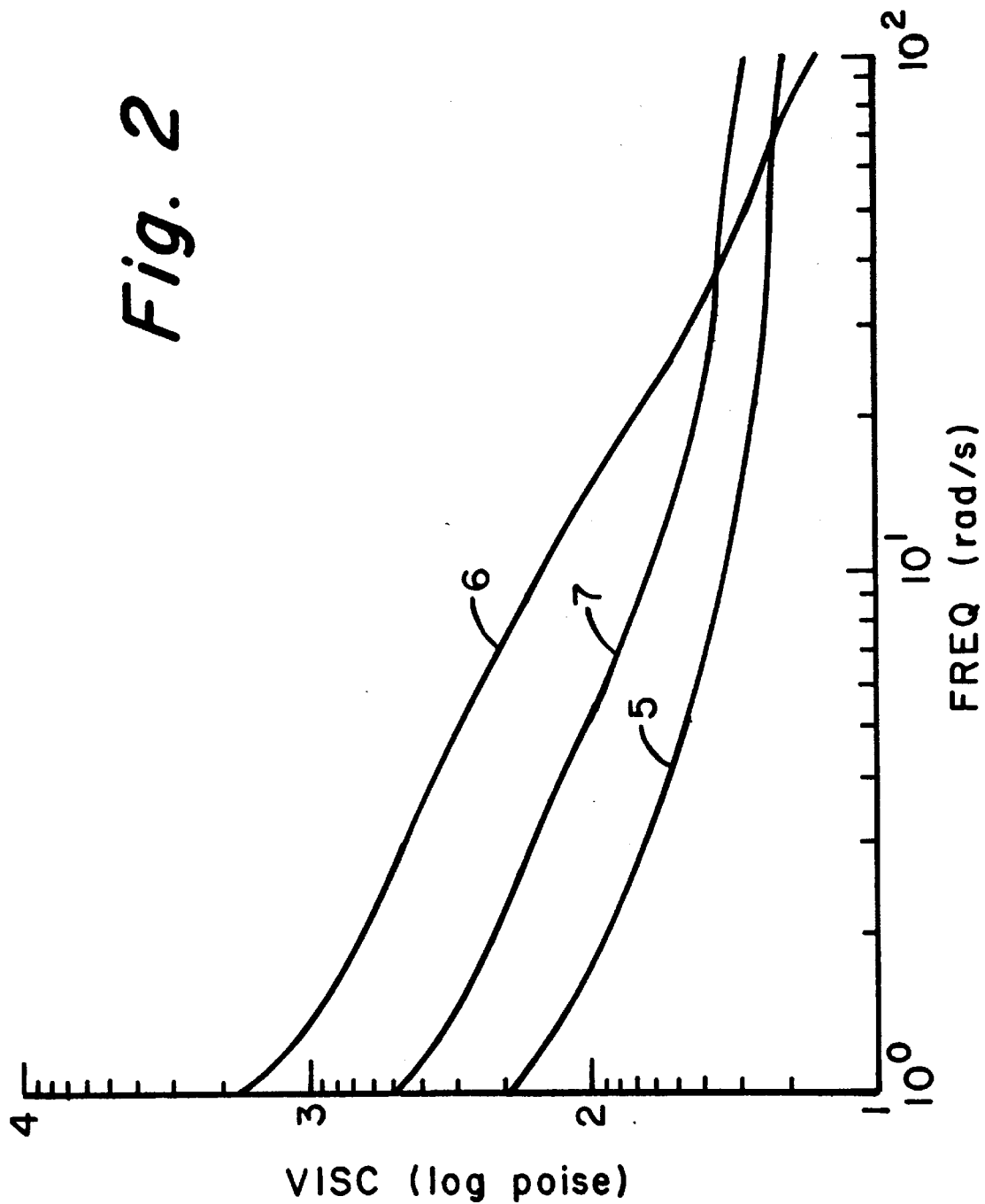
FIG. 2 is a graphical representation of the invention as applied to a lead sealing glass.

FIG. 2 displays the rheology curves for the blends of TABLE II. Again, the curves are identified by numbers corresponding to the blend numbers. FIG. 2 is a graphic representation corresponding to FIG. 1, and having measurements plotted thereon in the same manner.

It will be observed that essentially the same effect on viscosity is observed with the lead-zinc-borosilicate frits of TABLE II that was observed with respect to the non-lead frits of TABLE I. Thus, curve 6, based on blend 6 with the fine alumina addition, is much steeper than curves 5 and 7. These curves represent blends 5 and 7 which contain the same amount of alumina as blend 6, but having a coarser particle size.

TABLE II

| Blend | 5 | 6 | 7 |
|---|---|---|---|
| Lead Base Frit | 96 | 96 | 96 |
| Alumina (0.5μ) | 0 | 4 | 0 |
| Alumina (6–8μ) | 2 | 0 | 4 |

TABLE II-continued

| Blend | 5 | 6 | 7 |
|---|---|---|---|
| Alumina (4–6μ) | 1 | 0 | 0 |
| Alumina (10–15μ) | 1 | 0 | 0 |

TABLE III sets forth, in weight percent, a further series of sealing glass paste blends. In this TABLE, blends 8 and 9 contain additions of zirconia, while blends 10 and 11 contain comparable additions of alumina. The frit employed had the tin-zinc-phosphate composition shown in blend 1 of TABLE I.

TABLE III

| Blend | 8 | 9 | 10 | 11 |
|---|---|---|---|---|
| Frit | 70 | 70 | 70 | 70 |
| Beta-Eucryptite | 10 | 10 | 10 | 10 |
| Zircon | 15 | 15 | 15 | 15 |
| Zirconia (0.5μ) | 5 | 0 | 0 | 0 |
| Zirconia (6–8μ) | 0 | 5 | 0 | 0 |
| Alumina (0.5μ) | 0 | 0 | 5 | 0 |
| Alumina (6–8μ) | 0 | 0 | 0 | 5 |

It will be observed that blends 8 and 10 contain very fine particle size (0.5 μ) zirconia and alumina, respectively. Likewise, blends 9 and 11 contain larger particle size (6–8μ) zirconia and alumina, respectively.

Figure 3:
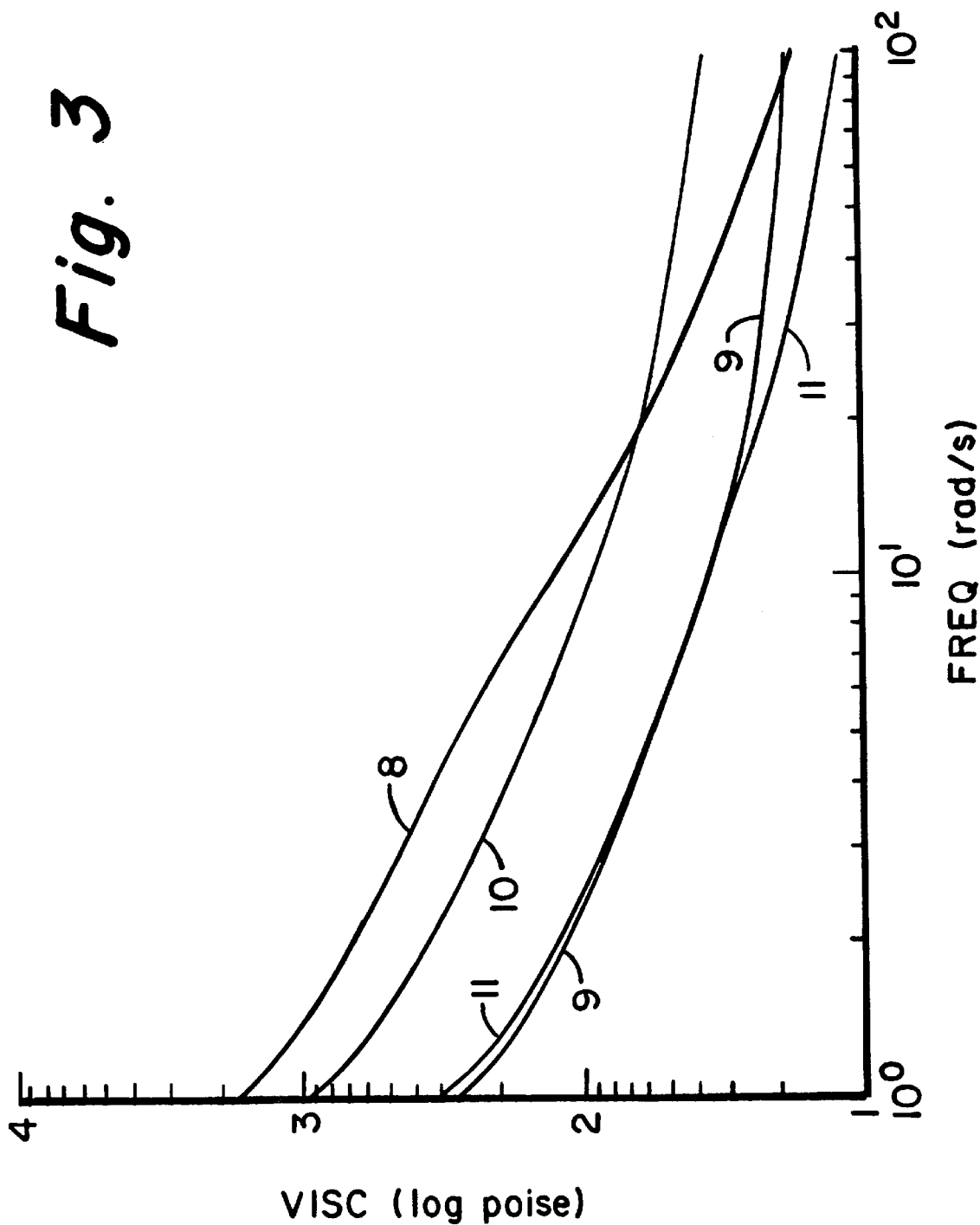
FIG. 3 is a graphical representation of the invention showing its general applicability.

These blends were mixed in the manner described above to produce sealing glass pastes. Rheology measurements were made with the oscillatory analyzer as described above. FIG. 3 displays the rheology curves for blends 8–11 based on these measurements.

FIG. 3 is a graphic representation corresponding to FIGS. 1 and 2 with rheology measurements plotted thereon in like manner. The rheology curves are identified by numbers corresponding to the blend numbers in TABLE III.

It will be observed that the rheological effects, shown by the fine particle size versus the coarser particle size materials, are virtually the same with zirconia as with alumina. Thus, both oxides provide much steeper rheological curves (8 and 10), as well as higher low shear viscosities, when present in the very fine size. While other compatible materials are not readily available in the very fine particle size, there is every reason to believe they would demonstrate a similar effect.

We claim:

1. A method of controlling the rheology of a sealing glass paste which comprises blending a compatible, inorganic powder with a sealing glass as a mill addition to impart a steep rheology curve to the paste, so that the paste resists flow while at rest, but flows readily when shear stress is applied, the inorganic powder having a particle size less than 6 microns and being present in the blend in an amount not over about 10 percent by weight.

2. A method in accordance with claim 1 which comprises blending an inorganic powder of alumina or zirconia with the sealing glass.

3. A method in accordance with claim 2 which comprises blending alumina with the sealing glass.

4. A method in accordance with claim 3 which comprises blending alumina with the sealing glass in an amount up to about 6 percent by weight of the glass plus alumina.

5. A method in accordance with claim 3 which comprises blending alumina having a particle size not over about 3 microns with the sealing glass.

6. A method in accordance with claim 5 wherein the particle size of the alumina is under one micron.

7. A method in accordance with claim 1 which comprises blending the powder with a sealing glass that is a non-lead, tin-zinc-phosphate glass frit.

8. A method in accordance with claim 1 which comprises blending the powder with a sealing glass that is a lead-zinc-borosilicate glass frit.

9. A method of improving a sealing glass paste, for use in producing a fusion seal, which comprises controlling the rheology of the paste by blending an inorganic powder in the paste as a mill addition to impart a steep rheology curve to the paste so that the paste resists flow while at rest, but flows readily when shear stress is applied, the amount of inorganic powder blended being not over about 10 percent by weight and having a particle size of less than 6 microns.

10. A method in accordance with claim 9 which comprises controlling the rheology of the paste by incorporating alumina or zirconia in the paste.

* * * * *